March 7, 1961 R. L. RODERICK ET AL 2,973,643
AIRCRAFT RATE OF CLIMB INDICATING INSTRUMENTS
Filed April 1, 1957 4 Sheets-Sheet 1

INVENTOR.
ROBERT L. RODERICK
BY John C. McGregor
ATTORNEY

INVENTOR.
ROBERT L. RODERICK
BY
John C. McBryan
ATTORNEY

INVENTORS
ROBERT L. RODERICK and
BY EDWARD S. GWATHMEY their ATTORNEY

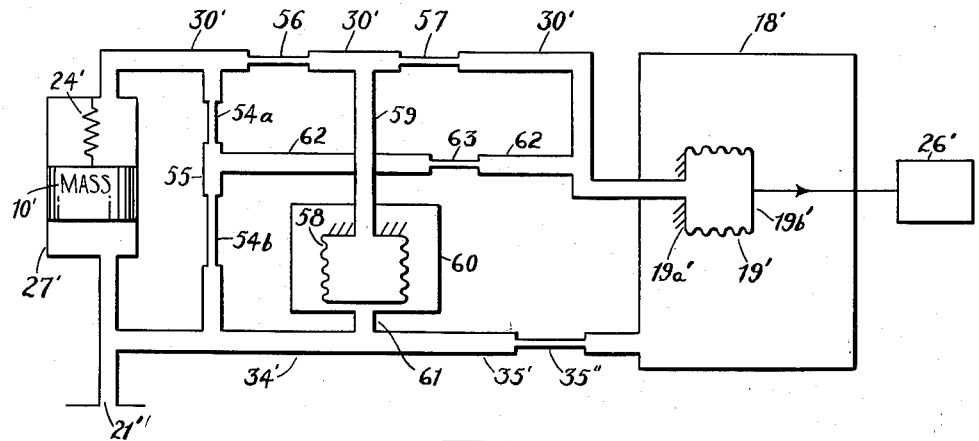
Fig. 7
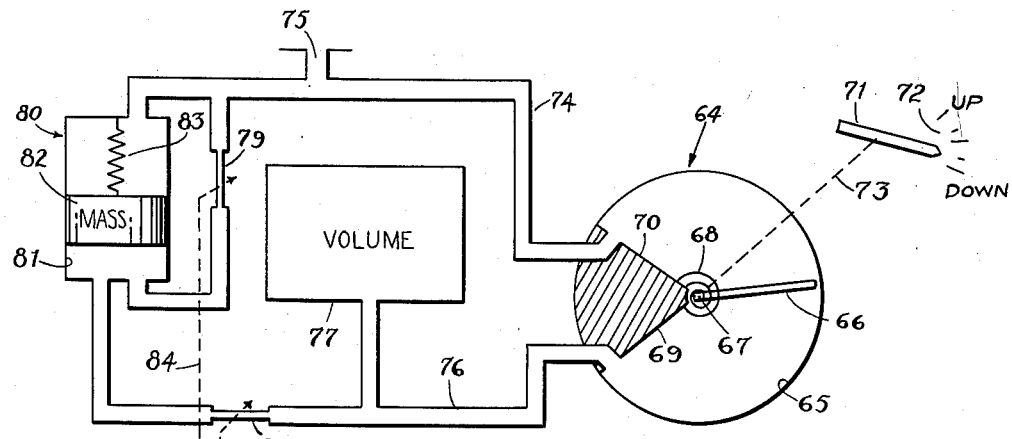
Fig. 8
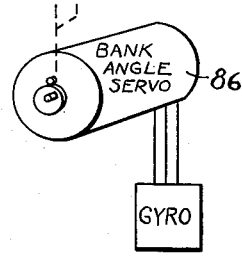
INVENTOR.
ROBERT L. RODERICK and
BY EDWARD S. GWATHMEY
their ATTORNEY

United States Patent Office 2,973,643
Patented Mar. 7, 1961

2,973,643

AIRCRAFT RATE OF CLIMB INDICATING INSTRUMENTS

Robert L. Roderick, Gardena, Calif., and Edward S. Gwathmey, Earlysville, Va., assignors to Specialties, Inc., Syosset, N.Y., a corporation of New York Filed Apr. 1, 1957, Ser. No. 649,992

18 Claims. (Cl. 73—179)

This invention relates to aircraft instruments and more particularly to rate of climb or vertical speed indicators affording substantially instantaneous readings.

This application is a continuation-in-part of co-pending application, Serial No. 484,678, filed January 28, 1955, now abandoned.

Conventional rate of climb indicators operate on a principle of pressure measurement across a pneumatic resistance between a fixed volume and static pressure. Such instruments, due to the damping required to minimize spurious indications in the presence of atmospheric turbulence, have an inherently long time constant which results in the instrument indication lagging the true vertical speed. When an airplane departs from or enters level flight an interval as long as five to ten seconds can elapse before the pointer is within 10 percent of the correct value. Moreover, the lag, long at best, is not necessarily constant but differs depending upon the altitude of operation. In high speed airplanes and in blind flying operations these lags and variations seriously limit the usefulness of the conventional instrument.

It is therefore one object of the present invention to provide an improved instrument for indicating rate of climb or vertical speed which overcomes the several disadvantages of prior instruments by affording relatively accurate and timely output indications.

Another object of the invention is to provide an instrument for affording indications of rate of climb for aircraft or the like in which those values which are at a frequency too rapid to be used in the control of the aircraft are eliminated.

Another object of the invention is to provide an instrument for use in aircraft or the like for indicating rate of climb in which overshoot is closely controlled.

Another object of the invention is to provide various compensations in a rate of climb indicating instrument.

In accordance with the invention, a rate of climb or vertical speed indicator is provided including both means responsive to pressure change such as the atmospheric pressure gradient and means responsive to acceleration normal, in most cases, to the fore and aft axis of the airplane, the two responses being controlled and combined to afford an output indication which is accurately representative of vertical speed at any given instant.

A representative embodiment of the invention utilizes a vertically-movable mass, operatively connected either to or as part of a signal generator, preferably pneumatic and taking the form of a spring loaded dash pot affording a first output signal which is a function of an acceleration. To provide a second output signal, also preferably pneumatic, is a static pressure source and a fixed volume vented to the static source through a pneumatic resistance, across which appears a signal in the form of a pressure differential representative of changing atmospheric pressure. The two output signals are combined in complementary fashion, preferably by combining the pneumatic output deriving from the movable mass to the pneumatic pressure differential across the pneumatic resistance to produce a resultant output which can be translated into motion of a pointer on either side of a zero setting to indicate instantaneous vertical speed up or down.

In order to minimize the effects of pitch, the mass can be pendulously supported and to minimize the effects of bank and turn the effect of the acceleration signal developed by the mass can be made to fade out with time. Alternatively, compensations for bank and turn can be introduced by means of a gyroscope, which can be part of other aircraft instrumentation and which is provided with kickoffs providing signals which are functions of bank angles. The signals are applied to modulate the output of the instrument either by controlling the movable mass through an electromagnetic forcer or by controlling the pneumatic signals generated thereby. To provide an accurate flight path control instrument indicating vertical speed as well as bank angles, the entire indicator assembly can be turned relative to the aircraft, as by a servo amplifier for bank angle under the control of a remote gyroscope.

In certain cases, particularly at relatively low frequencies, the phasing of the signals from the vertically movable mass and the pressure-responsive member is such, using the equipment described above, that readings are obtained which cause the pilot to overcontrol the aircraft. Also, rate of climb indications can be derived which are at a higher frequency than the pilot can use. Both of these factors can be corrected in accordance with the present invention by placing in tandem with the pneumatic output of the vertically-movable mass a pneumatic filter, the values of which can be so chosen as to eliminate entirely the dip in frequency response and, at the same time, to act as a low pass filter on the output of the vertically-movable mass.

So that the pilot can readily correct small errors in flight arising as a result of vertical movement of the aircraft, a predetermined amount of phase advance can be introduced in a particular frequency range, say between 0.1 and 1.0 cycles per second. Such controlled phase advance or anticipation can be provided in accordance with the present invention by introducing additional movable mass means into the system to compensate for the delays inherent in the pneumatic resistances.

In order that the invention will be more fully understood and readily carried into effect, the following detailed description is given with reference to the accompanying drawings in which.

Figure 6:
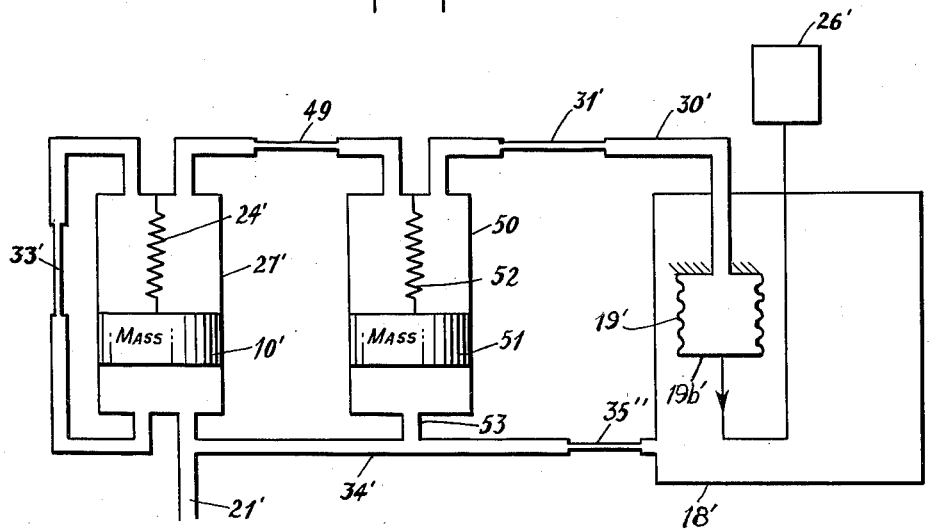
Figure 6 is a diagrammatic representation of another form of rate of climb indicating instrument in which controlled anticipatory indications of the rate of climb are provided.

Figure 7 is a diagrammatic representation of a rate of climb indicating instrument which affords an anticipatory indication of rate of clmb using a different arrangement of parts from those of Figure 6; and Figure 8 is a diagrammatic representation of a rate of climb indicating instrument which embodies a compensation for spurious readings arising from pitch and bank and turn and which affords consistently accurate readings over a wide range of altitudes of operation.

Figure 1:
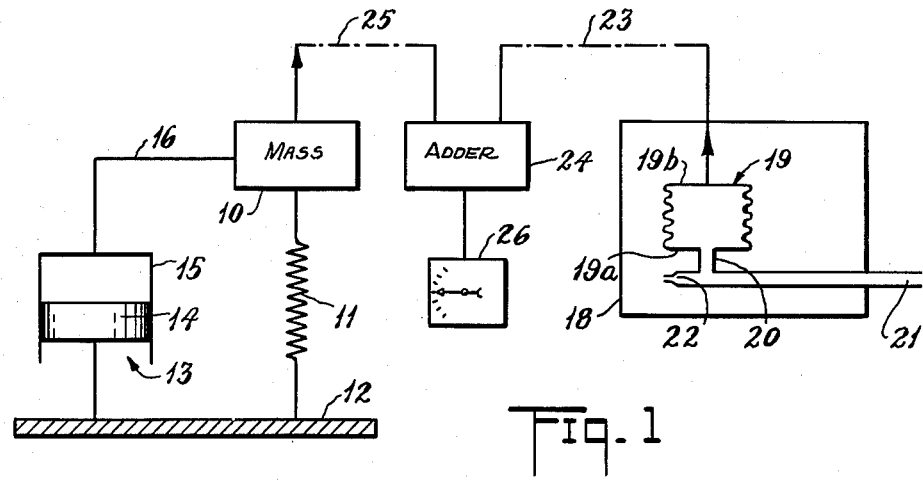
Figure 1 is a diagrammatic representation of a rate of climb indicating instrument.

Referring first to Figure 1 of the drawing, the invention is illustrated as embodied in a basic rate of climb indicating instrument. The instrument includes a mass 10 mounted as by a spring 11 for vertical movement with respect to a support 12, the support also carrying a dash pot or pump assembly 13 which can take the form of a plunger 14 fixedly mounted on the support and received within a cylinder 15, the latter being coupled by link mechanism 16 to move with the mass 10.

Wall means 18 define a closed volume or container within which pressure-responsive means such as a bellows-type diaphragm or a capsule 19 is mounted. The capsule 19 is preferably mounted so that one surface 19a is fixed with respect to the container 18 and the other surface 19b is free to move. It will be understood that the capsule or movable member comprises an expansible member which is resiliently biased to a neutral position by virtue of its inherent spring rate deriving, for example, from the resilience of the flexible walls. Thus, the container becomes in effect a pneumatic capacitance. The capsule 19 is coupled by a conduit 20 to a static pressure source such, for example, as a static line 21 of the type normally provided in airplanes to reflect surrounding air pressure conditions. The static line 21 is also connected to the inside of the closed volume defined by the container 18 by means of a pneumatic resistance 22 or restriction, preferably taking the form of a capillary or of an orifice. Various combinations of capillaries, orifices and diffusers can also be used.

The movable portion 19b of the capsule 19 is coupled as by an input linkage 23, for example, to an adding means 24 which can be mechanical, electrical or pneumatic and to which the mass 10 can also be coupled as by an input linkage 25, for example. The two inputs 23 and 25 to the adding means 24 result in a single output signal appearing in an output indicator 26.

In operation, assuming the carrier vehicle to be an airplane going into a climb and the instrument to be mounted so that the mass 10 can partake of motion with at least a vertical component normal to the fore and aft axis, the mass 10 will be caused by the acceleration forces normal to the flight path of the airplane to move downwardly against the force of the spring 11 and the dash pot assembly 13. This results in an almost immediate signal in the adding means 24 which results immediately in an instrument reading. Because the effect of the mass 10 is a transient in that it endures only so long as the acceleration forces are present, its signal to the adding means 24 tends to disappear quickly. Meantime, however, the airplane will have moved upwardly into relatively less dense atmosphere and the pressure will have fallen in the static line 21 causing the capsule 19 to reflect the decreased pressure by means of compressing action in which its movable surface 19b furnishes an output signal to the adding means 24. This signal, if the component parts of the instrument are properly coordinated, will complement the decaying signal from the mass 10 and continue to induce an output signal which represents the rate of climb of the airplane. A steady state condition of the capsule 19 will endure as long as the airplane continues a constant climb. A steady state condition will exist due to the leakage through the pneumatic resistance 22 through which air will flow from the fixed volume to the static line until such time as the airplane levels off and static air pressure no longer changes.

However, because of the time lag which inheres in the capsule action, the capsule will not resume its initial configuration instantaneously when the airplane levels off. Rather, it will slowly recover its initial configuration only in proportion to the ability of the pneumatic resistance 22 to equalize the static pressure and the pressure within the fixed volume. At the instant of leveling off, however, a negative acceleration will be present in the mass 10 which will reverse its signal to the adding means 24 and thus cancel out the enduring and erroneous signal from the capsule. In this fashion the output indicator 26 will instantaneously indicate to the pilot that he is no longer in a state of climb.

Figure 2:
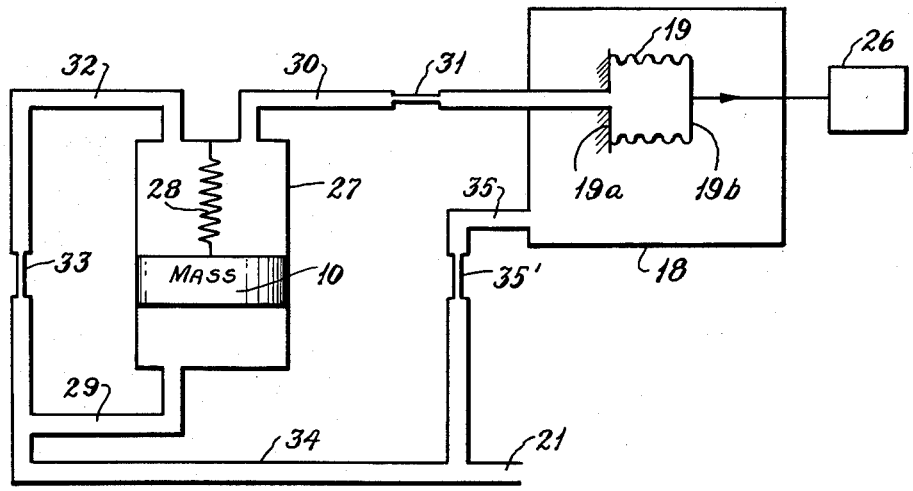
Figure 2 is a diagrammatic representation of a modified form of a rate of climb indicating instrument in which the effect of sustained acceleration fades away with time.

Referring to Figure 2, there is shown a modified form of rate of climb indicating instrument in which the coupling between the movable mass 10 and the pressure-responsive means or capsule 19 is pneumatic and in which means is provided whereby the effect of sustained acceleration such as is experienced in turns will fade away with time. In this arrangement, in which parts more or less identical to those of Figure 1 are identified by like reference characters, the mass 10 is movably mounted within a cylinder 27, with the mass and cylinder constituting a dash pot assembly. The mass 10 is resiliently positioned within the cylinder as by a spring 28. The dash pot assembly, including the cylinder 27 and piston mass 10 is mounted in a fixed manner along that axis of the carrier which is normally vertical.

One end of the cylinder 27 is connected by means of a conduit 34 to a static pressure source such, for example, as the static line 21, and the other end is connected by a conduit 30 to the inside of the capsule 19. Mounted in the conduit 30 is a pneumatic resistance such as a capillary 31. The two ends of the cylinder 27 of the dash pot assembly are pneumatically joined by means of a conduit 32 in which is mounted a second pneumatic resistance such as a capillary 33. The lower end of the cylinder 27 is connected to the conduits 32 and 34 by a conduit 29. Also connected to the static line, by a conduit 35 having a third pneumatic resistance such as a capillary 35′, which can take the form of a compensating diffuser, is the fixed volume defined by the wall means 18.

In the arrangement of Figure 2 the motion of the mass 10 within the cylinder 27 under the influence of acceleration of the carrier vehicle results either in an increase in or decrease in pressure within the capsule 19. Assuming the vehicle to be an airplane beginning a climb, the mass 10 will tend to move downwardly under the influence of the initial turn into the climb creating a decreased pressure in the upper end of the cylinder 27. This results in a flow of air through the conduit 30 and the capillary 31, causing the capsule 19 to be compressed and resulting in motion of the movable portion 19b which is reflected in an output signal in the indicator 26, certain details of which are described below. Meantime, the static pressure will begin to fall as a result of the movement of the airplane into a more rarefied atmosphere, and air will flow through the conduit 35 and the capillary 35a at a slow rate. There will also be a flow of air from the capsule 19 through the conduit 30 with its capillary 31, the conduit 32 with its capillary 33, and the conduit 34 to the static line 21. The mass 10 will during this interval have assumed its initial position of balance within the cylinder 27 under the influence of the spring 28.

The sizes of the capillaries 31 and 33 are so arranged relative to the size of the capillary 35a that a differential pressure condition will be present as long as the airplane climbs. This will result in a deformation of the capsule 19 in which the movable portion 19b will maintain substantially the same position which it assumed as a result of the pumping action of the mass 10 caused by the initial acceleration of the airplane. When the airplane levels off and during the interval which it would normally take the pressure in the fixed volume to assume the pressure in the static line, the mass 10 will move upward to create a positive pressure in the conduit 30 which will result in a flow of air into the capsule 19, causing it to expand to its initial configuration. If the aircraft is banked in a level turn, the acceleration force initially causes the mass 10 to move downward, resulting in a decrease in pressure above the mass 10 and so, through the conduit 30, a decrease in the pressure in the capsule 19. Consequently, the capsule 19 starts to deflect to indicate a vertical speed upward. However, the leakage through the capillary 33, via the conduits 34 and 32 diminishes the effect, as does the spring 28 working to return the mass 10 to its initial position. Hence the initial erroneous indication fades away.

Figure 3:
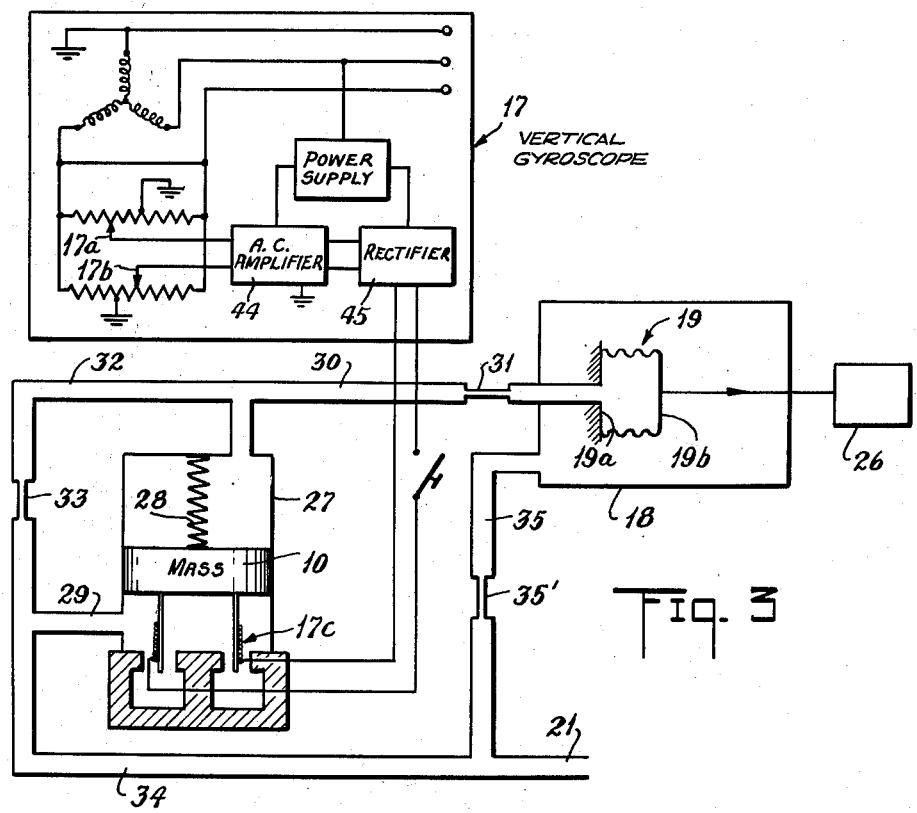
Figure 3 is a diagrammatic representation of a modified form of rate of climb indicating instrument compensated for pitch and bank errors.

Referring to Figure 3, the indicator described in Figure 2 is modified to introduce compensation against movement of the mass 10 caused by bank and turn of the carrier vehicle. To this end there is provided a vertical gyroscope 17 (which can be a remote gyroscope belonging, for example, to another instrument) having pickoffs 17a and 17b to furnish, via a suitable amplifier 44 and rectifier 45, signals which are a function of bank angles to energize an electromagnetic forcer 17c coupled to the mass 10. The mass is thereby constrained against movement which would result from acceleration forces due to bank and turn. Should there be a failure in the gyroscope system, including failure of electrical power, the instrument will nevertheless continue to operate satisfactorily for turns with bank angles as high as 30° to 40°.

Figure 4:
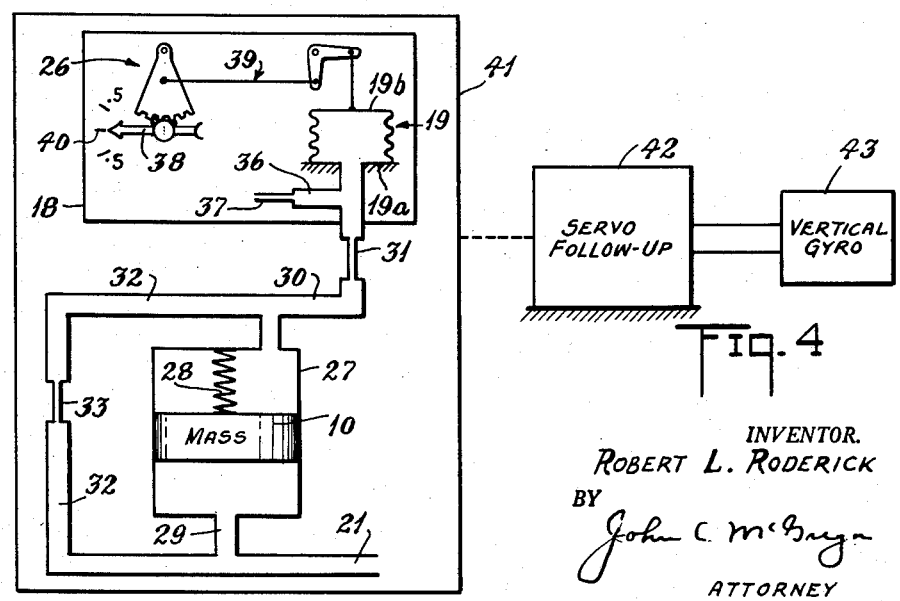
Figure 4 is a diagrammatic representation of another form of rate of climb indicator arranged as part of a flight path control instrument.

Referring to Figure 4, another modified arrangement of the vertical speed indicator is shown in which components corresponding to those of Figures 1 and 2 are identified by like reference numerals. The conduit 35 and its capillary 35a, which appear in Figure 2, are eliminated and a bypass conduit 36 and a capillary 37 substituted, the latter discharging within the pneumatic capacitance or sealed volume defined by the wall means 18.

In the operation of this arrangement, assuming a vertical climb for an airplane, the mass 10 will move downwardly in piston fashion within the cylinder 27 initially creating a low pressure in the conduit 30 which will be felt by the capsule to the extent determined by the size of the capillary 31. This will establish an initial compression in the capsule 19 which will in turn be reflected in the output indicator 26. If the airplane continues to rise in a steady climb, the mass 10 will, under the influence of the spring 28, slowly assume its initial equilibrium position within the cylinder 27 while the static pressure, continuously decreasing, serves as the pumping source to create a rarefied atmosphere within the capsule to continue the state of equilibrium achieved as a result of the initial pumping action of the mass 10. This condition of equilibrium, as in the preceding arrangements, is controlled by the capillary 37 which communicates with the closed volume. A representative design for the indicator 26 is shown diagrammatically in Figure 4. In this arrangement, the capsule 19 operates a pointer 38 through a linkage 39, the pointer preferably being horizontal for reasons described below and adapted to work in conjunction with a calibrated, zero-center scale 40.

In each of the arrangements described above, it will be understood that the pressure-sensitive portions of the indicator can incorporate heavy damping as a means of counteracting the effects of turbulent air. Whereas, heavy damping normally introduces even greater time lags into instruments of this type, the present invention utilizing a movable mass provides for full correction notwithstanding extreme damping. Generally speaking, it is preferable that the movable mass be used in conjunction with a system having a long time constant fade-out so that steady state errors do not arise.

If desired, any of the indicating devices of the type described herein can be utilized as part of an automatic aircraft flight path control instrument. This can be done as illustrated diagrammatically in Figure 4, by mounting the indicator unit, including both the pressure-responsive portion and the vertically-movable mass responsive to vertical accelerations, in a unitary housing 41 for stabilization under the control of a servo motor and follow-up unit 42 in accordance with bank signals received from a gyroscope 43, which can be remotely mounted. Preferably, the servo motor and follow-up unit is fixed to the instrument panel of the airplane and arranged to define a casing in which the indicator unit is rotatably mounted.

By reference to a pointer on the instrument, relative to suitable indices on the fixed casing or on the instrument panel, the pilot will be able to ascertain readily the bank attitude of the airplane. By reference to the pointer relative to the calibrated scale 40, the instantaneous vertical speed can be read, not as a function of the bank angle of the airplane, but as a direct reading of vertical motion of the airplane. If correction for pitch attitude changes is required, the vertically-movable mass assembly in the inner unit is supported in pendulous fashion in a vertical longitudinal plane, although it will be understood that for small pitch attitude changes a nonpendulous mounting is sufficiently accurate for most purposes.

Figure 5:
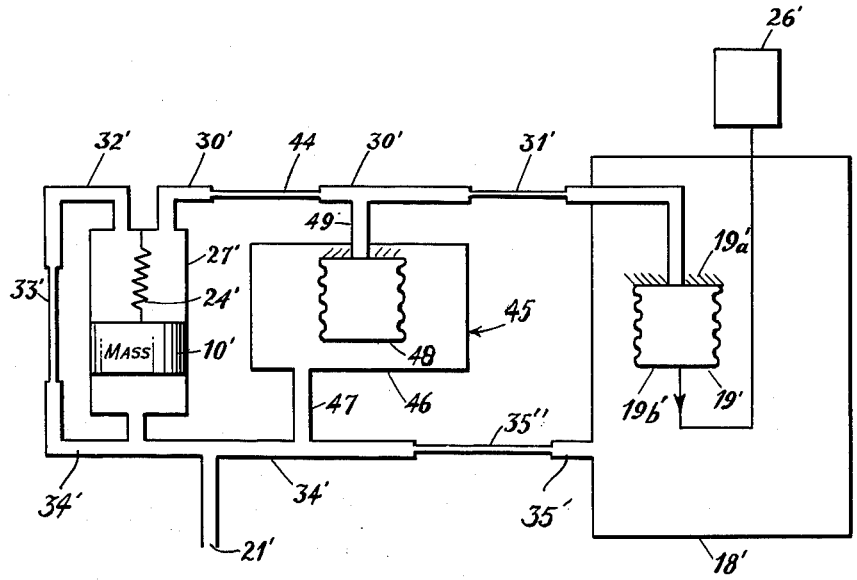
Figure 5 is a diagrammatic representation of another form of rate of climb indicating instrument in which the transient response is nearly critically damped to prevent overshoot of the indicator.

Referring to Figure 5, there is illustrated an embodiment of the invention which is capable of affording an accurate indication of the vertical rate of motion of the airplane over a wide range of frequencies. In addition, however, the system of Figure 5 is so arranged that it affords no response at frequencies higher than those that can be used by the pilot.

The system of Figure 5 includes, for purposes of illustration, the basic system of Figure 2 described above and like parts are identified by like, primed reference numerals. Connected across the movable mass 10′ and cylinder 27′ is a pneumatic resistance such as a capillary 44 and a pneumatic capacitance assembly 45 including a static chamber 46 vented by a conduit 47 to the static pressure source 21′ via the conduit 34′. Suspended within the chamber 46 is a pressure-sensitive unit such as an expansible bellows or capsule 48 connected by a conduit 49 to the capillary 44 in the conduit 30′. As in the arrangement of Figure 2, the conduit 30′ is connected to the diaphragm 19′ through a capillary 31′.

In operation, assuming for example that the airplane moves into a climb, there will be an initial vertical acceleration tending to drive the mass 10′ downwardly in its cylinder 27′ against the force of the positioning spring 24′. At this instant a pressure differential will be established across the capillary 33′ due to the decrease in pressure at the upper end of the cylinder 27′. This decrease in pressure will also make itself felt across the capillary 44 to the inside of the expansible unit or diaphragm 48 which will, due to the differential in internal and external pressures occasioned by the connection of the closed chamber 46 to the static pressure source 21′, compress slightly to relieve to a certain degree the decreased pressure in the conduit 30′ between the capillaries 44 and 31′. In this phase, the effect of the downward motion of the mass 10′ on the pressure-sensitive output diaphragm 19′ is reduced. As the airplane continues to move upwardly in its climb, the static pressure component of the signal to the output diaphragm 19′ will begin to make itself felt; the mass 10′ meantime, being freed of acceleration forces, will begin to return to its neutral position at a rate determined by the resilient forces of the spring 24′ and the air pressure equilizing circuits which are connected across the cylinder. The decrease in static pressure as the airplane moves into more rarefied atmosphere will make itself felt inside the output portion 19 through a circuit including the static pressure source 21′, the conduit 34′, the capillary 33′, the conduit 32′, the top of the cylinder 27′ and the conduit 30′ including the series connected capillaries 44 and 31′. At a relatively slower rate the decrease in static pressure will be felt in the closed volume defined by the walls 18′ through the relatively higher pneumatic resistance defined by the diffuser or capillary 35″. While this is occurring, the diaphragm 48 in the static chamber 46 will likewise be feeling directly the decrease in static pressure via the conduit 47. This decrease in pressure coupled with the inherent resilience of the partially compressed diaphragm 48 will supplement the signal to the inside of the diaphragm 19' through the conduit 30 and the capillary 31'.

By the proper choice of parameters and values for the several component parts, it is possible in accordance with the invention to make the phasing of the static pressure signals and the signals from the vertically-movable mass nearly exact and so eliminate the dip in the frequency response which is characteristic of conventional instruments. Moreover, the diaphragm 48 and the additional capillary 44 serve to absorb high frequency signals which derive primarily from the movable mass 10', thereby serving as a low pass filter which admits to the output diaphragm 19' only those signals which the pilot is able to use. As the airplane leaves its climb or, alternatively, as it departs from level flight into descent or negative climb, the direction of motion of the mass 10' of course reverses and the static pressure at the source 21 eventually increases and the same general functions described above occur in reverse with the diaphragm 19' expanding to indicate the negative rate of climb.

Referring now to Figure 6, there is shown a rate of climb indicating instrument which, for purposes of illustration, likewise embodies the basic components of Figure 2 which are again identified by like, primed reference numerals. The instrument of Figure 6 is arranged to afford the advantages as to frequency response and phasing of the modifications of Figure 5 and, in addition, to introduce a predetermined amount of phase advance or anticipation in a given frequency range, say 0.1 to 1.0 cycles per second, enabling the pilot to more easily correct small errors.

Connected across the cylinder 27' containing the mass 10' and its positioning spring 24' is a shunt loop including a pneumatic resistance such as a capillary 49, a vertically-disposed (with respect to the carrier vehicle) cylinder 50, a mass 51 movable therein against a positioning spring 52, and a conduit 53 leading to the static pressure source 21' via the conduit 34'. The upper end of the cylinder 50 is connected to the output diaphragm 19' through the conduit 30' including the capillary 31'.

In operation, the first movable mass 10' and its cylinder 27' and the pneumatic capacity of the second cylinder 50 tend to compensate for the delay inherent in the capillary 35''. Moreover, the second cylinder 50 and its movable mass 51 compensate for the delay introduced by the diaphragm 19' and its capillaries 33', 49 and 31'. The compensations introduced by the arrangement of Figure 6 can be made to overcompensate by a predetermined amount for the delay introduced by the diaphragm 19' and its capillaries, in this fashion providing a phase advance which is useful to the pilot of the airplane in correcting errors in flight. The operation of the system of Figure 6 is such that both the delay of the capillary 35'' and of the diaphragm 19' and its capillaries afford filtering of the static pressure input so that transient changes in static pressure, which do not necessarily represent rate of climb, are filtered out.

A representative working instrument based on the arrangement of Figure 6 included components of the following values:

Pneumatic resistance 31':
 Capillary diameter _____inch__ .014
 Capillary length _____do____ .375
Pneumatic resistance 33':
 Capillary diameter _____do____ .016
 Capillary length _____do____ .480
Pneumatic resistance 49:
 Capillary diameter _____do____ .018
 Capillary length _____do____ .436
Mass 10': weight _____grams__ 12.1
Spring 24': spring rate _____grams per inch__ 7.6
Mass 51': weight _____grams__ 3.1
Spring 52: spring rate _____grams per inch__ 6.5

Pneumatic resistance 35'' preferably takes the form of a compensating diffuser conventional to rate of climb instruments. Its pneumatic resistance value should be appropriate to the range of the instrument, being generally comparable to the values of resistances 31', 33' and 49. The response of this particular instrument is such that the pointer of the indicator 26 tends to follow closely the actual movement of the controls of the airplane by the pilot, that is to say, the response incorporates a phase advance.

Referring to Figure 7, there is illustrated a modified system for affording generally the same functional results as the system of Figure 6; that is, adequate damping of transient responses is effected and a predetermined phase advance or anticipation as between the static pressure signals and the signals from the movable mass is provided. The basic diaphragm and closed volume assembly as well as the vertically-movable mass and its cylinder assembly are essentially the same as those of Figure 2 and are again identified by like, primed reference numerals. Connected across the cylinder 27' are a pair of series-connected pneumatic resistances such as capillaries 54a and 54b in a conduit 55, and connecting the top of the cylinder 27' to the inside of the diaphragm 19' are pneumatic resistances such as series-connected capillaries 56 and 57, both in the conduit 30'. Pressure-responsive means such as a diaphragm or capsule 58 are connected by a conduit 59 to the conduit 30 between the capillaries 56 and 57. The diaphragm 58 is in turn suspended within a static chamber 60 connected by conduits 61 and 34' to the static pressure source 21'. The inside of the capsule 19' is connected by a conduit 62, including a capillary 63, to the conduit 55 between the capillaries 54a and 54b.

In operation, assuming the airplane goes into a climb, the mass 10' will move downwardly relative to the cylinder 27' creating a rarefication at the top of the cylinder which establishes momentarily a pressure differential across the two series-connected capillaries 54a and 54b and a pressure differential across the two capillaries 56 and 57 leading to the inside of the diaphragm 19'. The diaphragm 58, being connected between the capillaries 56 and 57 will respond more readily to this rarefication and will compress slightly, serving in the manner of a pneumatic capacitance. Meantime, as the airplane rises in the atmosphere the static pressure will drop at the source 21', which drop will be felt first in the static chamber 60 around the diaphragm 58 allowing the latter to expand both to maintain the decreased pressure in the capsule 19' to preserve the rate of climb reading in the indicator 26' and to absorb a certain portion of the pressure which occurs as the spring 24' returns the mass 10' to its initial position. The decreased static pressure at the source 21' will also make itself felt directly inside the capsule 19' through the capillary 54b in the conduit 55 and the capillary 63 in the conduit 62. Meantime, the closed volume defined by the walls 18' will begin venting at a slower rate through the capillary 35''. The relationship between the sizes of the several capillaries and the constants of the diaphragms 19' and 58 as well as the mass 10' and the cylinder 27' are so arranged that the desired phase advance or anticipation occurs together with the desired damping of unwanted signals. As the airplane leaves its climb or alternatively as it departs from level flight into a negative climb or descent, the direction of motion of the mass 10' of course reverses and the static pressure at the source 21' eventually increases and the same general functions described above occur in reverse with the capsule 19' expanding to indicate the negative rate of climb.

Referring to Figure 8, there is illustrated diagrammatically a rate of climb indicator embodying broadly features of the instruments described above but including a different bank and turn compensation and a different pressure-sensing construction. The pressure-sensing assembly 64 includes a cylindrical chamber 65 within which a movable member 66 is mounted for rotation on an axis 67 which corresponds to the axis of the cylindrical chamber. The movable member is normally urged by resilient means, such as a hairspring 68, to a position in the chamber 65 midway between limit stops 69 and 70. The movable member 66 is closely fitted within the chamber 65 so as to present a relatively high resistance to the flow of air around its four edges. In this fashion, the movable member divides the chamber into two relatively variable parts.

The instrument includes an indicator or pointer 71 which works in conjunction with a calibrated dial 72 and which is linked through drive shaft means 73 to turn with the movable member 66. The movable member turns in response to air pressure differentials on its two sides. The chamber 65 on one side of the movable member is connected by a conduit 74 to a source of static pressure 75, normally the static line of the airplane, and on its other side by a conduit 76 to a pneumatic capacitance in the form of a closed volume 77. The closed volume 77 is also connected to the static pressure source 75 through a circuit including a pneumatic resistance 78, normally taking the form of a capillary, and a second pneumatic resistance 79, also normally taking the form of a capillary.

Connected across the pneumatic resistance 79 is a movable mass assembly indicated generally by the numeral 80 and including a cylinder 81 having its axis normally aligned with the vertical axis of the airplane and within which is mounted a piston-mass 82 yieldably supported approximately midway between the ends of the cylinder by a spring 83. The upper end of the cylinder 81 is connected directly to the static pressure source 75, and the lower end is connected between the pneumatic resistances 78 and 79.

In operation, assuming the airplane goes into a climb from level flight, the forces of acceleration will initially drive the piston-mass 82 downwardly in the cylinder 81 to introduce pneumatic pressure to one side of the movable member 66 through a circuit including the pneumatic resistance 78 and the conduit 76. The other side of the movable member being subjected to static pressures, the member will assume a new position of balance in the chamber 65 by swinging upwardly carrying with it the pointer 71 which will immediately indicate upward velocity on the dial 72. As the airplane continues in its climb, the acceleration forces of its initial turn into the climb will decay and the mass 82 will, under the forces of the spring 83, begin to return to its initial position in the cylinder 81. Meantime, the static pressure will be dropping to introduce a rarefied atmosphere or suction to the other side of the movable member 66 via the conduit 74. This force will be counteracted by the controlled leakage of air from the closed volume 77 and also from the lower side of the chamber 65 through a circuit including the two pneumatic resistances 78 and 79 in series to the static pressure source 75. Depending on the values and parameters of the various components of the system, a certain amount of this leakage will be taken up momentarily by the capacity of the cylinder 81 and the mass 82 therein moving upwardly to its neutral position under the force of the spring 83. With steady climb conditions, a balance of pneumatic forces will obtain across the movable member 66 which will hold the pointer 71 in position to indicate the vertical speed.

It will be understood that the values of the pneumatic resistances 78 and 79 are selected to take into account the leakage, representing pneumatic resistance, across the four edges of the movable member. In the event it is desired to introduce compensations for the forces attendant a bank and turn of the airplane, which would normally introduce spurious readings into the instrument, the pneumatic resistances 78 and 79 can be made variable as illustrated diagrammatically in Figure 8 as by the use, for example, of needle valve controls. The needle valve portions of the variable pneumatic resistances are coupled through linkage means 84 and 85 to a bank angle servo 86 driven from a remote gyroscope (not shown). The bank angle servo is energized to turn in one direction or the other depending on the direction of banking of the airplane, with the variable pneumatic resistances 78 and 79 being closed and opened respectively to shield the movable member from the effects of movement of the mass 82 and to bypass the cylinder 81 containing the movable mass. It will be understood that compensations for bank and turn can also be introduced into the system of Figure 8 in the manner of the arrangement of Figure 3.

Generally speaking, the pressure-sensing assembly 64, as opposed to the pressure-sensing assemblies of the preceding figures, is indifferent to the altitude of operation of the airplane so that this form of instrument is particularly useful over a wide range of altitudes. Also, the pressure-sensing assembly tends to be more sensitive to pneumatic pressure differentials and can be operated effectively from weaker pneumatic signals.

While the invention has been described above as embodied in representative rate of climb indicating instruments, it is to be understood that the description is illustrative of how the invention can be carried out and is not limiting as to how the invention can be practiced. For example, the movable mass has been described generally as being yieldably mounted for movement vertically with respect to the carrier vehicle. In the case of an airplane the mass would normally be mounted so that at least a component of its vertical movement occurs normal to the direction of flight. In this fashion the mass is made to respond to the accelerations attendant the change in direction of flight path projected in a vertical plane. For those carriers such as helicopters in which the axis of the carrier does not necessarily change direction with a change in flight direction, the mass would be also mounted for movement vertically with respect to the axis of the carrier but would respond directly to vertical accelerations. The use of the term acceleration herein is intended to cover both positive acceleration and negative acceleration, i.e. deceleration. The invention should not therefore be regarded as limited except as defined in the following claims:

We claim:

1. An instrument for indicating vertical speed of a carrier vehicle comprising means responsive to the atmospheric pressure gradient to afford a first pneumatic signal representing vertical speed at a preceding instant, a mass movable relatively to the carrier vehicle in response to acceleration forces attendant vertical movement thereof, means responsive to movement of the mass to afford second pneumatic signals, pneumatic combining means to receive concurrently both the first and second pneumatic signals to develop a common pneumatic output signal indicative of substantially instantaneous vertical speed of the carrier vehicle, an output means responsive to the pneumatic output signal of the combining means to indicate instantaneous vertical speed of the carrier vehicle.

2. An instrument for indicating vertical speed of a carrier vehicle comprising pressure-sensing means including a portion movable in response to the atmospheric pressure gradient to afford an output motion representing vertical speed, pneumatic resistance means connected to said pressure-sensing means to introduce a time lag into the response thereof to the atmospheric gradient, a mass movably mounted relatively to the carrier vehicle in response to acceleration forces attendant vertical movement thereof, means responsive to movement of the mass to afford pneumatic pressures and pneumatic conduit means to couple the pneumatic pressures to said pressure sensing means to modulate the response motion of said movable portion, and output means driven by the movable portion to indicate substantially instantaneous vertical speed of the carrier vehicle.

3. An instrument for indicating vertical speed of a carrier vehicle comprising a member movable in response to pneumatic pressure differentials thereacross, wall means defining a closed volume capable of sustaining pneumatic pressure differing from atmospheric, conduit means including a pneumatic resistance connecting the volume to the atmosphere, means to expose one side of the movable member to the pressure within the wall means and means to expose the other side of the member to atmospheric pressures, the last said means having substantially less pneumatic resistance than said conduit means, a mass yieldably supported relative to said carrier vehicle for movement in response to vertical acceleration forces, pneumatic means responsive to movement of the mass to create a pneumatic pressure differential and pneumatic conduit means connecting a pneumatic output of the pneumatic means to exert its effect on one side of said movable member, and means responsive to the movement of said movable member as a function of instantaneous vertical speed of the carrier vehicle.

4. An instrument for indicating vertical speed of a carrier vehicle comprising a member movable in response to pneumatic pressure differentials thereacross, wall means defining a closed volume capable of sustaining pneumatic pressure differing from atmospheric, conduit means including a pneumatic resistance connecting the volume to the atmosphere, means to expose one side of the movable member to the pressure within the wall means and means to expose the other side of the member to atmospheric pressures, the last said means having substantially less pneumatic resistance than said conduit means, a mass yieldably supported relative to said carrier vehicle for movement in response to vertical acceleration forces, dash pot means connected to said mass to create a pressure differential upon movement of the mass, pneumatic conduit means connecting the pneumatic output of the dash pot means to the movable member to actuate the movable member as a function of direction of oscillation, and means responsive to the movement of said movable member as a function of instantaneous vertical speed of the carrier vehicle.

5. An instrument for indicating vertical speed of a carrier vehicle comprising a member movable in response to pneumatic pressure differentials thereacross, wall means defining a closed volume capable of sustaining pneumatic pressure differing from atmospheric, means to expose on side of the movable member to the pressure within the wall means and means including a first pneumatic resistance connecting the other side of the movable member to the atmosphere, a pneumatic cylinder, a mass resiliently supported in the cylinder as a piston and movable in response to vertical acceleration forces of the carrier vehicle, and pneumatic conduit means connecting one end of the cylinder to exert the pneumatic pressures therein on said movable member to actuate the movable member as a function of direction of acceleration, and indicator means driven by said movable member.

6. An instrument as set forth in claim 5, said means connecting the cylinder to the movable member including a second pneumatic resistance.

7. An instrument as set forth in claim 5, said first pneumatic resistance including pneumatic diffuser means.

8. An instrument as set forth in claim 5, including a second cylinder and a mass yieldably supported therein as a piston and means including a third pneumatic resistance connecting one end of the second cylinder to the corresponding end of the first cylinder.

9. An instrument as set forth in claim 5, including a pneumatic resistance connecting said one end of the cylinder to the atmosphere.

10. An instrument as set forth in claim 5, including means connecting the other end of the cylinder to the atmosphere.

11. An instrument as set forth in claim 5, including a pneumatic capacitance connected across said cylinder.

12. An instrument as set forth in claim 5, said movable member comprising a vane, a chamber surrounding the vane and divided thereby into two parts, and resilient means urging the vane to a central position.

13. An instrument as set forth in claim 5, said movable member comprising an expansible member resiliently biased to a neutral position, said expansible member being mounted in the closed volume.

14. An instrument as set forth in claim 2, including gyroscope means affording an output signal representing changes in attitude of the carrier, and means responsive to the output of the gyroscope means to modify the output of said pneumatic cylinder.

15. An instrument as set forth in claim 14, said means responsive to the output of the gyroscope means comprising an electromagnetic forcer operative on said movable mass.

16. An instrument as set forth in claim 14, said means responsive to the output of the gyroscope means comprising means to vary said pneumatic resistance means.

17. An instrument as set forth in claim 14, said means connecting the cylinder to the movable member including a second pneumatic resistance, said means responsive to the output of the gyroscope means comprising means to vary the second pneumatic resistance.

18. An instrument according to claim 5, including a housing for the movable member, fixed volume, mass, cylinder and pneumatic restriction, means to mount the housing for turning movement in the carrier vehicle, gyroscope means affording an output representing the turning movement of the carrier about a horizontal axis, and means responsive to the output of the gyroscope means to turn the housing relative to the carrier to indicate altitude angles of the carrier vehicle.

References Cited in the file of this patent
UNITED STATES PATENTS
2,751,785    Fowler et al.            June 26, 1956